United States Patent [19]

Oban et al.

[11] 4,288,086
[45] Sep. 8, 1981

[54] FUEL TANK ARRANGEMENT FOR A TRACTOR

[75] Inventors: Harold C. Oban, Darien; Charles M. Peterson, Downers Grove, both of Ill.

[73] Assignee: International Harvester Company, Chicago, Ill.

[21] Appl. No.: 114,435

[22] Filed: Jan. 22, 1980

[51] Int. Cl.³ .................................... B60K 15/06
[52] U.S. Cl. .................................... 280/5 A; 137/571
[58] Field of Search .................. 280/5 A; 244/135 C; 137/571, 575, 217

[56] References Cited

U.S. PATENT DOCUMENTS

| 1,523,370 | 1/1925 | Skaggs | 137/571 |
| 2,481,135 | 9/1949 | Maness, Jr. | 280/5 A |
| 2,867,395 | 1/1959 | Saint | 280/5 A |
| 3,677,284 | 7/1972 | Mendez | 280/5 A |

*Primary Examiner*—Robert R. Song
*Attorney, Agent, or Firm*—Ronald C. Kamp; F. David AuBuchon

[57] ABSTRACT

A fuel tank arrangement for a tractor which stores its fuel in an auxiliary tank and a main tank that are spaced apart in the tractor. The tractor's engine receives its supply of fuel from a fuel pump after it has passed through a primary fuel filter. The fuel tank arrangement incorporates a first line fluidly connecting the main tank to the fuel pump. The arrangement also utilizes a main vent to connect the forwardmost portion of the upper section of the main tank to the atmosphere, and an auxiliary vent to connect the rearwardmost portion of the upper section of the auxiliary tank to the atmosphere. The next element of the arrangement is a supply system which requires all of the fuel to pass through the main tank to reach the fuel pump. The supply system fluidly connects the bottom section of the auxiliary tank with the forwardmost portion of the top section of the main tank through a second line. The second line includes a mechanism to pump fuel from the auxiliary tank to the main tank until the fuel in the main tank reaches a first predetermined volume. The second line also has a filtering element position between the pumping mechanism and the auxiliary tank to remove foreign matter from the fuel before it passes through the pumping mechanism. The last element of the arrangement is a dual purpose connector which is fluidly connected to the second line between the main tank and the pumping mechanism. This connector is also fluidly connected to the rearwardmost portion of the upper section of the auxiliary tank. In this position the connector vents the second line to the atmosphere when a vacuum occurs in the second line, while preventing the fuel flow from the pumping mechanism from entering the auxiliary tank.

7 Claims, 3 Drawing Figures

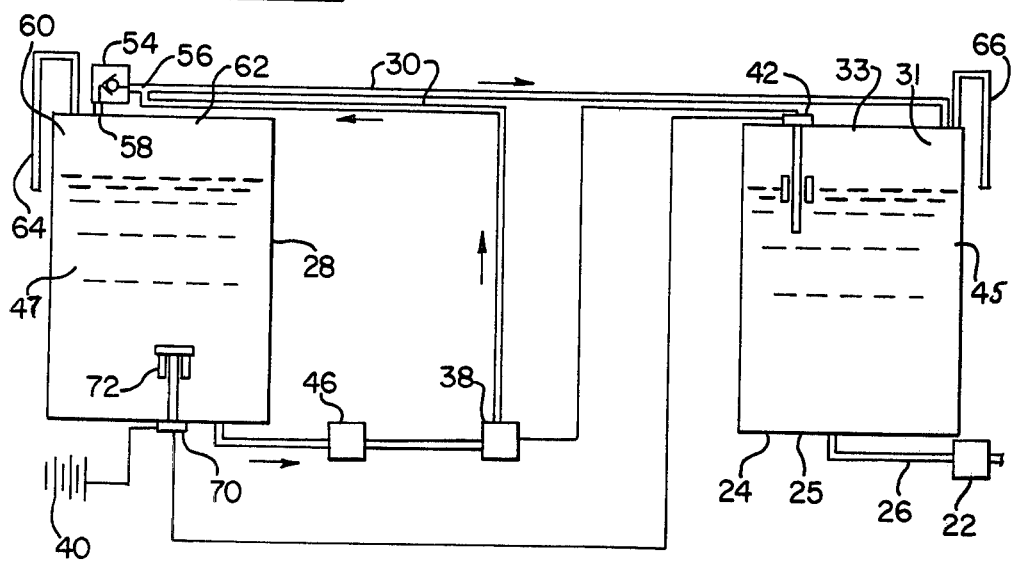

FUEL TANK ARRANGEMENT FOR A TRACTOR

BACKGROUND OF THE INVENTION

This invention relates generally to a fuel system for a tractor, and more particularly concerns a fuel system which incorporates a pair of fuel tanks to store the fuel.

The current trend in the agricultural industry is to increase the size of the unit of land being worked. By increasing the units size, the farmer can increase the efficiency of the time he spends in the fields through utilizing larger tractors to power larger implements.

To further increase his efficiency, the farmer can equip his larger tractor with an auxiliary fuel tank. The additional fuel capacity decreases the number of times the farmer must interrupt his work in the field to refuel his tractor. As a result, he can make better use of the limited time that is available for plowing, planting and harvesting his crop.

The use of these auxiliary tanks, although beneficial to the farmer, does complicate the design of the tractor's fuel system. The complications are produced by the fact that the fuel system must provide the engine with access to fuel from two remotely located storage tanks rather than a single tank.

There are two basic solutions to the problem created by this complication. The first solution involves supplying the fuel individually from each tank to the engine. At a minimum this solution requires a combination of a plurality of sophisticated sensing devices and valving to insure the engine an uninterrupted supply of fuel. It may even include a plurality of sequentially operated pumps to provide the necessary fuel flow.

In light of the extreme complexity of this solution, it carries with it a high cost of designing and manufacturing, as well as a greater susceptibility of the system to the caustic nature of the tractor's environment. The high cost and higher susceptability to failure make this solution the least desirable of the two possible solutions.

The more desirable solution involves interconnecting the tanks. This solution makes it possible to simplify the system by utilizing only one tank as a source of fuel from which the engine's fuel pump draws its fuel supply. Despite the desirability of the second solution, it still complicates the fuel system by requiring a mechanism that will prevent the overflow of one tank caused by the fuel in one tank flowing into the other tank.

A siphon caused overflow can occur in the interconnecting tank solution when one of the tanks is vertically displaced from the other tank by the location of the tanks in the tractor and/or the angle of the tractor on uneven terrain.

In addition, the use of interconnected fuel tanks in the fuel of a diesel engine causes further complications in the system. The additional complication arises from the fact that a diesel fuel system requires a mechanism to recycle the engine's high pressure, unused return fuel into the fuel supply system without disrupting the flow of fuel from the tanks to the engine.

Accordingly, it is an object of the present invention to provide a fuel tank arrangement for a tractor which supplies the tractor's engine with fuel from only one of a pair of interconnected fuel tanks.

More particularly, it is an object of the present invention to provide this type of fuel tank arrangement with a mechanism to eliminate the siphoning of fuel between the tanks.

Finally, it is object of the present invention to provide an interconnected non-siphoning fuel tank arrangement that is compatible with either gasoline or diesel tractor engines.

SUMMARY OF THE INVENTION

A fuel tank arrangement for a tractor which stores its fuel in an auxiliary tank and a main tank that are spaced apart in the tractor. The tractor's engine receives its supply of fuel from a fuel pump after it has passed through a primary fuel filter. The fuel tank arrangement incorporates a first line fluidly connecting the main tank to the fuel pump. The arrangement also utilizes a main vent to connect the forwardmost portion of the upper section of the main tank to the atmosphere, and an auxiliary vent to connect the rearwardmost portion of the upper section of the auxiliary tank to the atmosphere. The next element of the arrangement is a supply system which requires all of the fuel to pass through the main tank to reach the fuel pump. The supply system fluidly connects the bottom section of the auxiliary tank with the forwardmost portion of the top section of the main tank through a second line. The second line includes a mechanism to pump fuel from the auxiliary tank to the main tank until the fuel in the main tank reaches a first predetermined volume. The second line also has a filtering element position between the pumping mechanism and the auxiliary tank to remove foreign matter from the fuel before it passes through the pumping mechanism. The last element of the arrangement is a dual purpose connector which is fluidly connected to the second line between the main tank and the pumping mechanism. This connector is also fluidly connected to the rearwardmost portion of the upper section of the auxiliary tank. In this position the connector vents the second line to the atmosphere when a vacuum occurs in the second line, while preventing the fuel flow from the pumping mechanism from entering the auxiliary tank.

BRIEF DESCRIPTION OF THE DRAWINGS

Other objects and advantages of the invention will become apparent upon reading the following detailed description, and upon reference to the drawings in which:

FIG. 3 is a schematic representation of the present invention used in combination with a gasoline tractor engine.

While the invention will be described in connection with a preferred embodiment, it will be understood that it is not intended to limit the invention to that embodiment. On the contrary it is intended to cover all alternatives, modifications and equivalents as may be included within the spirit and scope of the invention as defined by the appended claims.

DETAILED DESCRIPTION OF THE INVENTION

Figure 1:
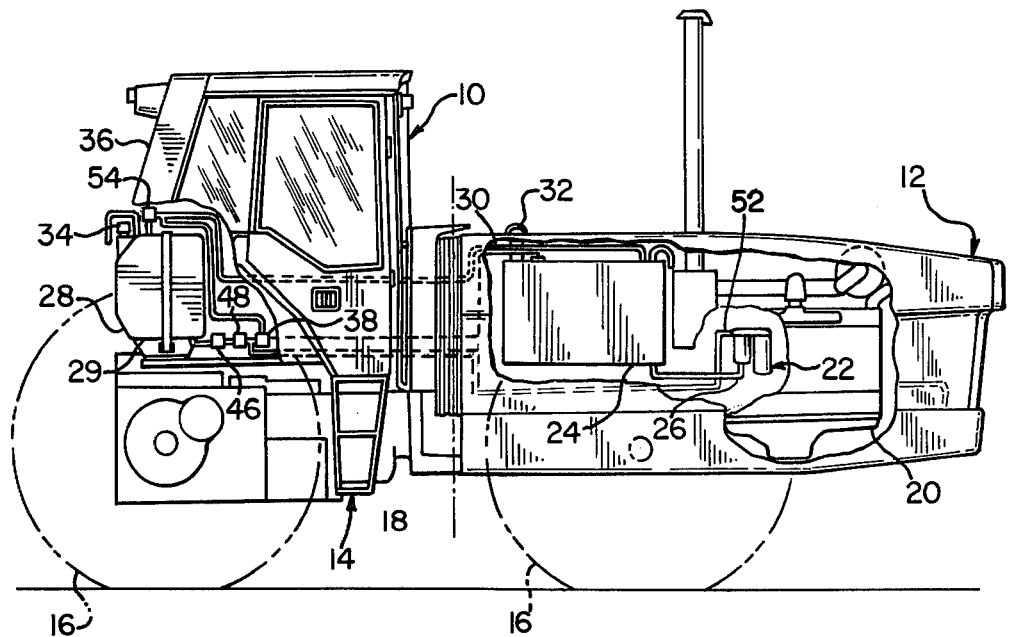
FIG. 1 is a side view of a tractor incorporating the present invention.

Turning first to FIG. 1, there is shown an articulated tractor 10 with its front section 12 and its rear section 14 each supported by a pair of driven, ground engaging wheels 16. The front section 12 is pivotally connected to the rear section 14 at the tractor's axis of articulation 18. The drive train of the preferred embodiment's tractor is fully set forth in the commonly owned application invented by Mr. Anthony M. Kestian and Mr. Raymond J. Allori, entitled, "Articulated Tractor Power Train". This commonly owned, co-pending application was filed in the United States Patent and Trademark Office on the same day as the present application, and is hereby incorporated by reference into the present application.

The source of the motive power for the preferred embodiment's tractor is a diesel engine 20 which is mounted on the front section 12. The engine receives its fuel supply from a fuel pump and filter 22 which draws fuel from the bottom section 25 of the main fuel tank 24 via a fuel line 26.

The preferred embodiment's main tank 24 is mounted in the front section 12 of the tractor. The main tank 24 is fluidly connected by a second fuel line 30 to the tractor's auxiliary tank 28 which is mounted in the rear section 14 of the tractor. As shown in FIG. 1, a second line 30 connects the bottom section 29 of the auxiliary tank 28 to the forwardmost portion 31 of the top section 33 of the main tank 24. FIG. 1 also shows that both the main 24 and auxiliary 28 tanks can receive fuel through their respective filler necks 32 and 34.

The fuel tanks of the preferred embodiment each contain fuel gauges (not shown) that are electrically connected to provide the tractor operator with a single meter display in the tractor control center 36 of the total volume of fuel in the tanks. It will be understood that the gauge's output could also be separately displayed to the operator.

Figure 2:
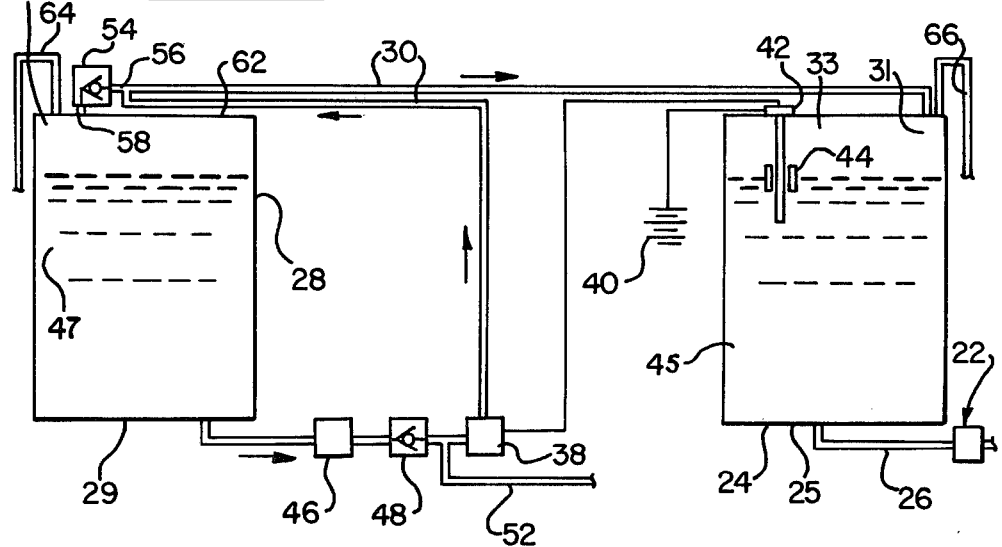
FIG. 2 is a schematic representation of the present invention used in combination with a diesel tractor engine.

FIGS. 1 and 2 show the preferred embodiment's electrically powered pump 38 fluidly connected to the second fuel line 30 between the main tank 24 and the auxiliary tank 28. The pump 38 receives power from the tractor's battery 40 via a float operated switch 42. In the illustrated embodiment, the float 44 allows the switch 42 to provide electric current to the pump 38 when the fuel 45 has reached a predetermined minimum volume in the main tank 24.

When the pump 38 receives the electrical current, it moves fuel from the auxiliary tank 28, through an auxiliary filter 46 and a check valve 48 to the main tank 24, as shown by the arrows in FIG. 2. The filter 46 and check valve 48 are serially positioned in the second line 30. The filter 46 removes foreign matter from the fuel 47 in the auxiliary tank before the fuel reaches the check valve 48 and the pump 38. This filtering prevents foreign material from damaging or interfering with the operation of the check valve 48 and the pump 38.

The operation of the check valve 48 will be understood, when consideration is given to the fact that diesel engines necessitate the use of a fuel return line 52 to recycle unused pressurized fuel from the engine into the fuel supply system of the tractor. In the preferred embodiment, return line is fluidly connected to the second fuel line 30 between the check valve 48 and the pump 38. This connection reduces the noise of the pump 38 and provides lubrication for the pump 38 by giving it a pressurized supply of return fuel during the operation of the tractor. The position of this connection with respect to the check valve 48 also keeps return fuel from flowing into the auxiliary tank 28.

FIGS. 1 and 2 also show a second check valve 54 incorporated in the preferred embodiment. The second check valve 54 is fluidly connected at 56 to the second line 30 and at 58 to the rearwardmost portion 60 of the top section 62 of the auxiliary tank 28. The check valve 54 is arranged to prevent pressurized fuel flowing through the second line 30 from the auxiliary pump 38 from entering the auxiliary tank 28.

The second function of the check valve 54 is to prevent a siphon caused overfilling of the main tank 24 by the fuel in the auxiliary tank 28. A siphoning action will be initiated when four conditions exist simultaneously. The first condition is the fuel level in the auxiliary tank 28 being at a higher elevation than the connection of the second line 30 to the main tank 24.

In the preferred embodiment this orientation will occur either when the auxiliary tank is filled to a level that places its fuel above the connection of the second line 30 to the main tank 24 or when the tractor is parked or stopped on sloping terrain with the front section 12 below the rear section 14. It will also be understood that elevational conditions can be satisfied by a tractor in different positions when the location of the tanks or their interconnection is arranged differently.

The second condition for a siphon action is that the second line 30 be completely filled with fuel, with the third condition being that the return line 52 and the pump 38 are not producing a flow of fuel in the second line 30. These conditions exist, in the preferred embodiment, when the engine in shut off, thereby eliminating the source of fuel for the return line 52 and the source of power for the pump 38.

The final condition for a siphon action is that the auxiliary tank 28 and the main tank 24 be at atmospheric pressure. In the illustrated embodiment, the auxiliary tank 28 is exposed to the atmosphere by the auxiliary vent 64. This vent 64 fluidly connects the rearwardmost portion 60 of the top section 62 of the auxiliary tank to the atmosphere. Similarly, the main tank 24 is exposed to atmospheric pressure by the fluid connection of the forwardmost portion 31 of its upper section 33 to the atmosphere by the main tank vent 66.

When these four conditions are met, a siphon action will start a flow of fuel from the auxiliary tank 28 through the second line 30 to the lower elevation of the main tank's connection to the second line 30. If the siphoning action is not broken, all of the fuel in the auxiliary tank 28 may flow into and then overflow from the main tank 24, because the main tank 24 is vented to the atmosphere. In the preferred embodiment, the check valve 54 breaks the siphon action by introducing air into the second line 30. The air introduced above the level of the fuel in the auxiliary tank 28, and will be introduced only and whenever the siphon action conditions are satisfied.

When these conditions exist, the fluid connection of the right side of the check valve 54 to the second line 30 and the fluid connection of the left side of the check valve 54 to the vented auxiliary tank 28, will produce a pressure differential across the check valve. The check valve 54 will respond to this pressure differential by opening. The open check valve will allow air to enter the second line 30 via the auxiliary tank vent 64, the auxiliary tank 28 and the check valve 54, thereby breaking the siphon-caused flow by introducing a pocket of air into the second line 30.

The introduction of air into the second line 30 is assured in the preferred embodiment by restricting the location of the fluid connection of both the auxiliary vent 64 and the check valve 54 to the rearwardmost portion 60 of the top section 62 of the auxiliary tank, because that space in the auxiliary tank will always be the first to develop an air pocket. The preferred embodiment similarly solves a siphoning action which could empty the main tank into the auxiliary tank by connecting the second line 30 to the forwardmost portion 31 of the upper section 33 of the main tank 24.

In keeping with the invention, the alternative embodiment, shown in FIG. 3, provides a fuel tank arrangement for use with a gasoline engine (not shown). This gasoline fuel tank arrangement is similar to the one described above which supplies fuel to a diesel engine. The elements of the alternative embodiment are substantially the same as the elements of the preferred embodiment with two exceptions. For the sake of brevity, the names, numerical designations, functions and descriptions of the elements of the alternate embodiment are to be considered identical to those of the preferred embodiment except as described below. It will be noted that the numerical designations of FIGS. 2 and 3 are identical for those elements which remain unchanged.

The first exception to the identicality of the embodiments results from the difference between a gasoline engine and a diesel engine. Unlike a diesel engine, which requires a fuel return line for recycling unused fuel from the engine, the gasoline engine has no such flow of return fuel. Therefore, there is no return fuel, return fuel line 52 or check valve 48 in the alternative embodiment.

The second exception to the indenticality of the embodiment results from the first exception's removal of the source of fuel for the electric powered pump 38, when the tractor is being operated with an empty auxiliary tank 28. Under these conditions, a second float operated switch 70 is serially interposed in the electrical connection between the battery 40 and the first switch 42. A second float 72 allows the second switch 70 to provide electric current to the first switch 42 when the fuel 47 in the auxiliary tank is above a predetermined minimum volume. As a result of their serially electrical connection, the pump 38 will only provide a flow of fuel between the fuel tanks when the fuel level in the auxiliary tank 28 is above its predetermined minimum and the fuel in the main tank 24 is below its predetermined maximum. It will be appreciated, that this serial pump control can be eliminated if the pump can operate without lubrication from the fuel.

With reflection on these exceptions and the above description of the preferred embodiment, it will be apparent that the preferred and alternative embodiments provide a fuel tank arrangement for their respective diesel and gasoline engines which supplies fuel to the tractor's engine from only one of a pair of interconnected fuel tanks. It will also be apparent that the embodiments are both provided with a mechanism to eliminate the siphoning of fuel between the auxiliary and main tanks.

Thus, it is apparent that there has been provided, in accordance with the invention, a fuel tank arrangement that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A fuel tank arrangement for a tractor having fuel stored in an auxiliary tank and a main tank, said tanks being spaced apart in said tractor with said fuel supplied to the engine of said tractor through a primary fuel filter by a fuel pump, said arrangement comprising, in combination:
   a first line fluidly connecting said main tank to said fuel pump;
   a main vent fluidly connecting the forwardmost portion of the upper section of said main tank to the atmosphere;
   an auxiliary vent fluidly connecting the rearwardmost portion of the upper section of said auxiliary tank to the atmosphere;
   a supply system whereby all of the fuel passes through said main tank to said fuel pump, said system including
   a second line fluidly connecting the bottom section of said auxiliary tank to said forwardmost portion of said top section of said main tank;
   first means fluidly interposed in said second line for providing fuel flow from said auxiliary tank to said main tank until said fuel in said main tank reaches a first predetermined volume;
   second means fluidly interposed in said second line between said first means and said auxiliary tank for removing foreign matter from said fuel before it passes through said first means; and
   third means fluidly connected to said second line between said first means and said main tank, and fluidly connected to said rearwardmost portion of said upper section of said auxiliary tank, for venting said second line to said atmosphere when a vacuum occurs in said second line, and for maintaining the exclusivity of said fuel flow from said first means to said main tank.

2. The invention of claim 1, wherein:
   said first means includes an electrically powered pump in said second line; and
   fourth means responsive to the fuel volume in said main tank for supplying electricity to said pump only when said fuel volume is below said first predetermined level.

3. The invention of claims 1 or 2, wherein: said third means includes a third line fluidly connecting said second line and said auxiliary tank; and
   a check valve interposed in said third line to vent said second line to atmosphere when said vacuum occurs.

4. The invention of claims 1, 2 or 3, wherein:
   said engine is a diesel engine having a return line fluidly connected to said second line between said main tank and said second means; and
   fifth means interposed in said second line between said second means and said connection between said return line and said second line for allowing flow only from said return line to said first means.

5. The invention of claim 4, wherein:
   said fifth means is a check valve fluidly interposed in said second line between said second means and said connection of said return line and said second line x; and
   said return line is connected to said second line between said first and second means.

6. The invention of claims 1 or 3, wherein:
   said engine is a gasoline engine; and
   said first means will supply said fuel flow when said fuel in said auxiliary tank is above a second predetermined volume and said fuel in said main tank is below said first predetermined volume.

7. The invention of claim 6, wherein:
said first means includes an electrically powered pump in said second line and a sixth means responsive to said fuel level in said auxiliary and main tanks, for supplying electricity to said pump only when said fuel in said main tank is below said first predetermined volume and said fuel is above said second predetermined volume in said auxiliary tank.

* * * * *